(12) United States Patent
Wood et al.

(10) Patent No.: US 11,418,581 B2
(45) Date of Patent: Aug. 16, 2022

(54) LOAD BALANCER SHARED SESSION CACHE

(71) Applicant: T-Mobile USA, Inc., Bellevue, WA (US)

(72) Inventors: Keith Wood, Black Diamond, WA (US); Boris Maisuradze, Kirkland, WA (US); Aditya Mehta, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 80 days.

(21) Appl. No.: 16/263,959

(22) Filed: Jan. 31, 2019

(65) Prior Publication Data

US 2020/0252449 A1 Aug. 6, 2020

(51) Int. Cl.

| H04L 67/1004 | (2022.01) |
| H04L 67/1027 | (2022.01) |
| H04L 67/5682 | (2022.01) |
| G06F 12/084  | (2016.01) |
| G06F 9/455   | (2018.01) |
| H04L 67/01   | (2022.01) |

(52) U.S. Cl.
CPC ...... *H04L 67/1004* (2013.01); *G06F 9/45558* (2013.01); *G06F 12/084* (2013.01); *H04L 67/1027* (2013.01); *H04L 67/2852* (2013.01); *H04L 67/42* (2013.01); *G06F 2009/4557* (2013.01); *G06F 2009/45595* (2013.01)

(58) Field of Classification Search
CPC ............. H04L 67/1004; H04L 67/1027; H04L 67/2852; H04L 67/42; G06F 9/45558; G06F 2009/4557; G06F 2009/45595
See application file for complete search history.

(56) References Cited

U.S. PATENT DOCUMENTS

| 8,825,877 B2 * | 9/2014 | Kakadia ................ G06F 9/5083 709/228 |
| 8,996,614 B2 * | 3/2015 | Choudhary ......... H04L 65/4076 709/203 |
| 9,143,558 B2 * | 9/2015 | Blander .............. H04L 67/1029 |
| 10,055,591 B1 * | 8/2018 | Sharifi Mehr .......... G06F 21/31 |
| 10,412,159 B1 * | 9/2019 | McCullagh ......... H04L 67/1038 |
| 10,637,929 B1 * | 4/2020 | Rai ..................... H04L 65/1053 |

(Continued)

OTHER PUBLICATIONS

Gandhi et al., "Yoda: A Highly Available layer—7 load balancer", EuroSys 2016: Proceedings of the Eleventh Conference on Computer Systems, Apr. 2016.*

*Primary Examiner* — Todd L Barker

(74) *Attorney, Agent, or Firm* — Lee & Hayes, P.C.

(57) ABSTRACT

A shared session cache can be accessible by multiple load balancers, and can indicate whether client devices are associated with specific backend servers of a server pool. When a client device connects to a load balancer, the load balancer can use the shared session cache to determine if the client device is already associated with a specific backend server. If so, the load balancer can connect the client device to that specific backend server so that it can continue an existing session with the specific backend server. If not, the load balancer can select a new backend server for the client device, connect the client device to the newly selected backend server, and create an entry in the shared session cache indicating that the client device is associated with the newly selected backend server.

20 Claims, 7 Drawing Sheets

(56) References Cited

U.S. PATENT DOCUMENTS

| | | | |
|---|---|---|---|
| 2002/0120743 A1* | 8/2002 | Shabtay | H04L 67/1014 709/226 |
| 2004/0243892 A1* | 12/2004 | McBride | G06F 11/2074 714/724 |
| 2005/0063324 A1* | 3/2005 | O'Neill | H04W 40/248 370/310 |
| 2005/0108397 A1* | 5/2005 | Basso | H04L 67/1002 709/225 |
| 2006/0155805 A1* | 7/2006 | Kim | H04L 67/2814 709/203 |
| 2006/0282509 A1* | 12/2006 | Kilian | H04L 67/02 709/217 |
| 2011/0010581 A1* | 1/2011 | Tanttu | G06F 9/5038 714/11 |
| 2011/0145420 A1* | 6/2011 | Kakadia | H04L 67/142 709/228 |
| 2012/0066487 A1* | 3/2012 | Brown | G06F 9/5083 713/150 |
| 2014/0223011 A1* | 8/2014 | Smith | H04L 47/762 709/226 |
| 2014/0310418 A1* | 10/2014 | Sorenson, III | H04L 67/1002 709/226 |
| 2016/0026514 A1* | 1/2016 | Cucinotta | G06F 9/54 718/105 |
| 2016/0306678 A1* | 10/2016 | Hira | G06F 9/5083 |
| 2018/0123940 A1* | 5/2018 | Rimar | H04L 45/02 |
| 2018/0365271 A1* | 12/2018 | Castaing | H04L 67/18 |
| 2019/0182363 A1* | 6/2019 | Bonaventure | H04L 69/14 |
| 2020/0084269 A1* | 3/2020 | Husar | H04L 67/1023 |

\* cited by examiner

| Shared Session Cache 112 | | | | |
|---|---|---|---|---|
| Source Identifier 202A | Destination Identifier 204A | Timer 206A | Forward Destination Identifier 208A | Reverse Source Identifier 210A |
| Source Identifier 202B | Destination Identifier 204B | Timer 206B | Forward Destination Identifier 208B | Reverse Source Identifier 210B |
| ... | ... | ... | ... | ... |
| Source Identifier 202N | Destination Identifier 204N | Timer 206N | Forward Destination Identifier 208N | Reverse Source Identifier 210N |

FIG. 2

LOAD BALANCER SHARED SESSION CACHE

BACKGROUND

Load balancers can be used in network environments to distribute traffic from client devices across multiple backend servers in a server pool. Each backend server in the server pool can provide the same data and/or services to client devices. Accordingly, high demand resources can be hosted at multiple backend servers, and load balancers can distribute network requests for those high demand resources across the server pool to avoid overloading individual backend servers.

Load balancers can distribute traffic devices among backend servers based on various selection strategies. For example, load balancers can select a particular backend server for a particular client device at random, using a round robin selection process, based on which backend server has the most available resources, or using any other selection strategy.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 depicts an example of a shared session cache.

DETAILED DESCRIPTION

Introduction

Figure 1A:
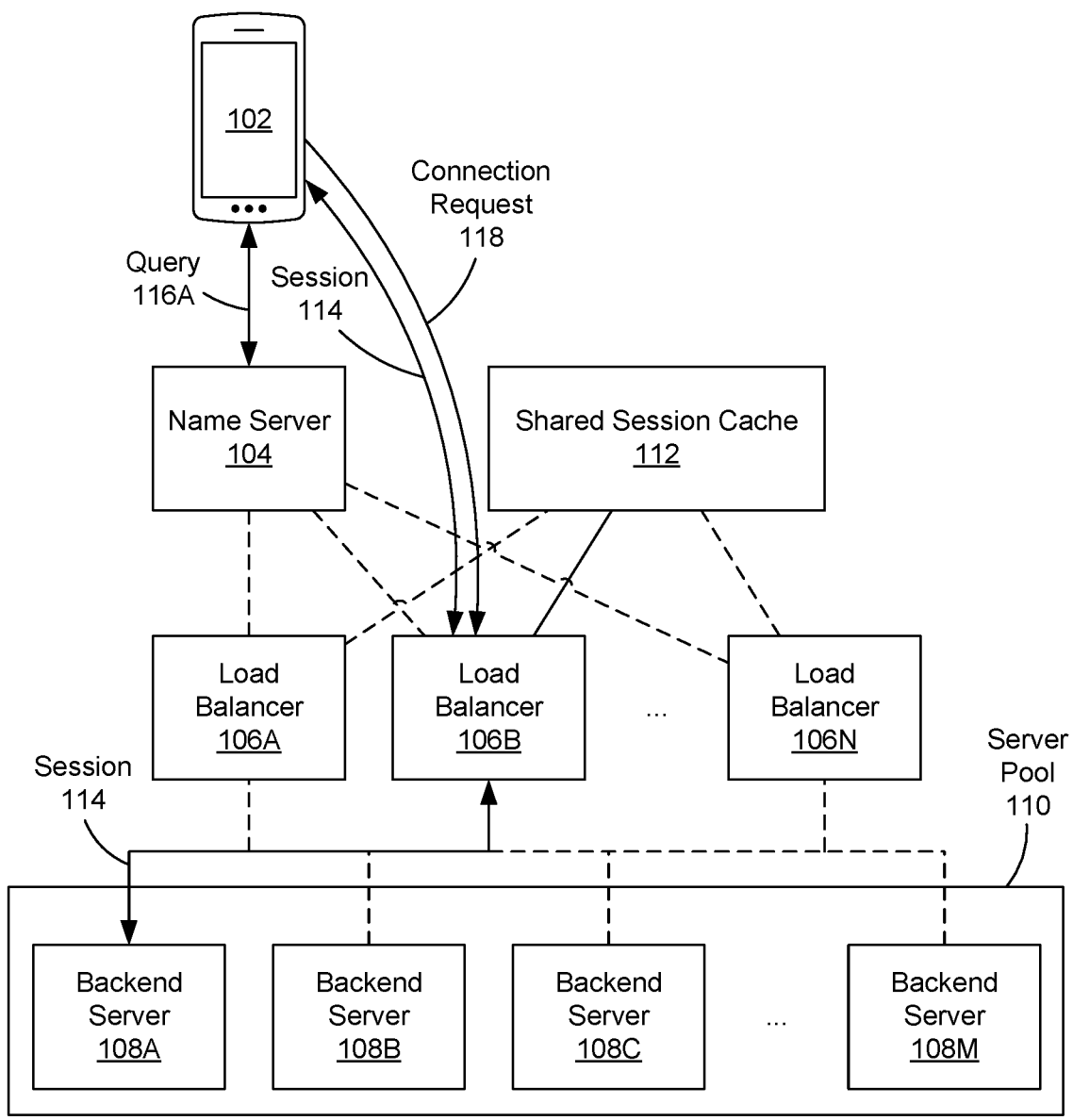
FIGS. 1A and 1B depict an example in which a client device connected to a particular backend server of a server pool can be reconnected to that particular backend server to continue a session based on a shared session cache.

Client devices, such as mobile phones and computers, can send network requests to access network resources hosted at backend servers. However, to avoid overloading a single backend server with traffic from client devices when the network resources are, or are expected to be, popular, multiple backend servers in a server pool can be configured to host the same network resources.

Load balancers can be configured to distribute traffic from client devices among available backend servers of the server pool. The load balancers can be associated with Internet Protocol (IP) addresses, such as virtual IP (VIP) addresses, that are also associated with a hostname such as www.example.com. A client device can accordingly use a single hostname to be connected to a load balancer, which can in turn connect the client device to one of the available backend servers in the server pool. The client device can thus reach an available backend server in a server pool via a single hostname, rather than attempting to contact different backend servers via different hostnames, different Uniform Resource Locators (URLs), or different IP addresses.

When a client device contacts a load balancer associated with a server pool, the load balancer can select one of the backend servers in the server pool for the client device, and connect that client device to the selected backend server. For example, a load balancer can determine which of the backend servers currently has the most available resources and connect the client device to that backend server, can select backend servers for client devices using round robin selection or random selection schemes, or by using any other selection strategy.

Many conventional load balancing systems use high availability (HA) pairs of load balancers. An HA load balancer pair generally has a primary load balancer and a backup load balancer for redundancy. Both the primary load balancer and the backup load balancer can share an IP address, such as a VIP address. A primary load balancer of an HA load balancer pair can select backend servers for client devices, and route traffic between those backend servers and the client devices when the primary load balancer is active. Both load balancers in the HA load balancer pair can share data about existing connections between client devices and backup servers, so that if the primary load balancer fails or experiences other errors, the backup load balancer of the HA load balancer pair can step in to continue distributing client devices among the backend servers and routing traffic between the backend servers and the client devices. Because the two load balancers in the HA load balancer pair can use the same VIP, the backend servers and/or the client devices can connect to the backup load balancer using the same VIP as the primary load balancer.

However, conventional HA pairs of load balancers have several drawbacks. For example, having a backup load balancer in each pair can be an inefficient use of resources, because the backup load balancers are intended to be idle unless they need to take over due to failures of the primary load balancers. If both load balancers in an HA load balancer pair fail simultaneously, connections between client devices and backend servers can be terminated. Additionally, while either the primary or the backup load balancer may be active, either one may have a finite amount of resources and may become overloaded in heavy traffic situations.

To avoid overloading the active load balancer in a conventional HA load balancer pair, additional HA load balancer pairs can be added to the network to handle the additional traffic. However, because in this solution each HA load balancer pair has its own primary and backup load balancers, half of the overall load balancing resources can sit idle even if demand from client devices remains high.

Additionally, if additional HA load balancer pairs are added to a network environment, the additional HA load balancer pairs may be unable to determine if a particular client device has already been associated with a particular backend server by another HA load balancer pair. This can be especially problematic if a client device and a backend server establish a persistent session in which user activity is tracked as the client device interacts with the backend server. If a client device connects to a backend server via a first HA load balancer pair and begins a persistent session, but the connection is interrupted and the client device reconnects to a different HA load balancer pair that does not have information about the session, the different HA load balancer pair may connect the client device to a new backend server. Although the new backend server may host the same content as the previous backend server, the new backend server would not have information about the existing session with the client device. Accordingly, the session would appear to have been terminated to the client device. This can be frustrating for users.

For example, a first HA load balancer pair may connect a client device to a first backend server. The client device and the first backend server can begin a session during which items are added to an electronic shopping cart. However, if the client device's connection with the backend server is interrupted, the client device may reconnect to a different, second HA load balancer pair. Conventionally, that second HA load balancer pair is separate and disconnected from the first HA balancer pair, such that it would not have information indicating that the client device had already been connected to the first backend server. Accordingly, the second HA load balancer pair may choose to connect the client device to a second backend server. Although the second backend server may host the same content as the first backend server, it would not have information about the previously existing session between the client device and the first backend server. Accordingly, it would appear to a user of the client device that electronic shopping cart is empty despite having added items to it during the earlier connection with the first backend server.

Described herein are systems and methods in which any number of load balancers can be used in association with a server pool, and each load balancer can access a shared session cache to determine if a particular client device is already associated with a particular backend server in the server pool. For example, a client device can be connected by a first load balancer to a first backend server, and the client device can begin a session with that first backend server. The first load balancer can also create an entry in the shared session cache associating the client device with the first backend server. If the first load balancer experiences an error or is taken offline, the client device can instead connect to a second load balancer. The second load balancer can determine from the shared session cache that the client device is already associated with the first backend server, and can accordingly reconnect the client device to the first backend server to continue the existing session.

The shared session cache can therefore allow any load balancer to handle connections from any client device without losing existing sessions between client devices and specific backend servers. If a new load balancer takes over for a client device, the new load balancer can use the shared session cache to connect the client device to the same backend server it had previously been connected to. By reconnecting the client device to the same backend server that was already handling a session with the client device, the change in load balancers can effectively be invisible to users of the client devices, even if the new load balancer is associated with a different VIP address than the previous load balancer.

Additionally, the shared session cache can allow physical and/or virtual load balancers to be added to, or removed from, the system at any time without causing client devices to lose existing sessions with backend servers. The system's load balancing capacity can thus be scaled up or down based on demand or available computing resources. Unlike systems that use multiple HA load balancer pairs but leave half of the overall load balancers sitting idle as backups, the shared session cache can allow each of them to be put into service and select appropriate backend servers for client devices. If any of the load balancers experience errors or are taken offline, any connections it had been handling can be rerouted through a different one of the load balancers, which can reconnect client devices to corresponding backend servers using the shared session cache. The shared session cache that can therefore allow load balancing resources to be used more efficiently, as well as allowing the load balancing resources to be scalable.

Example Environments

Figure 1B:
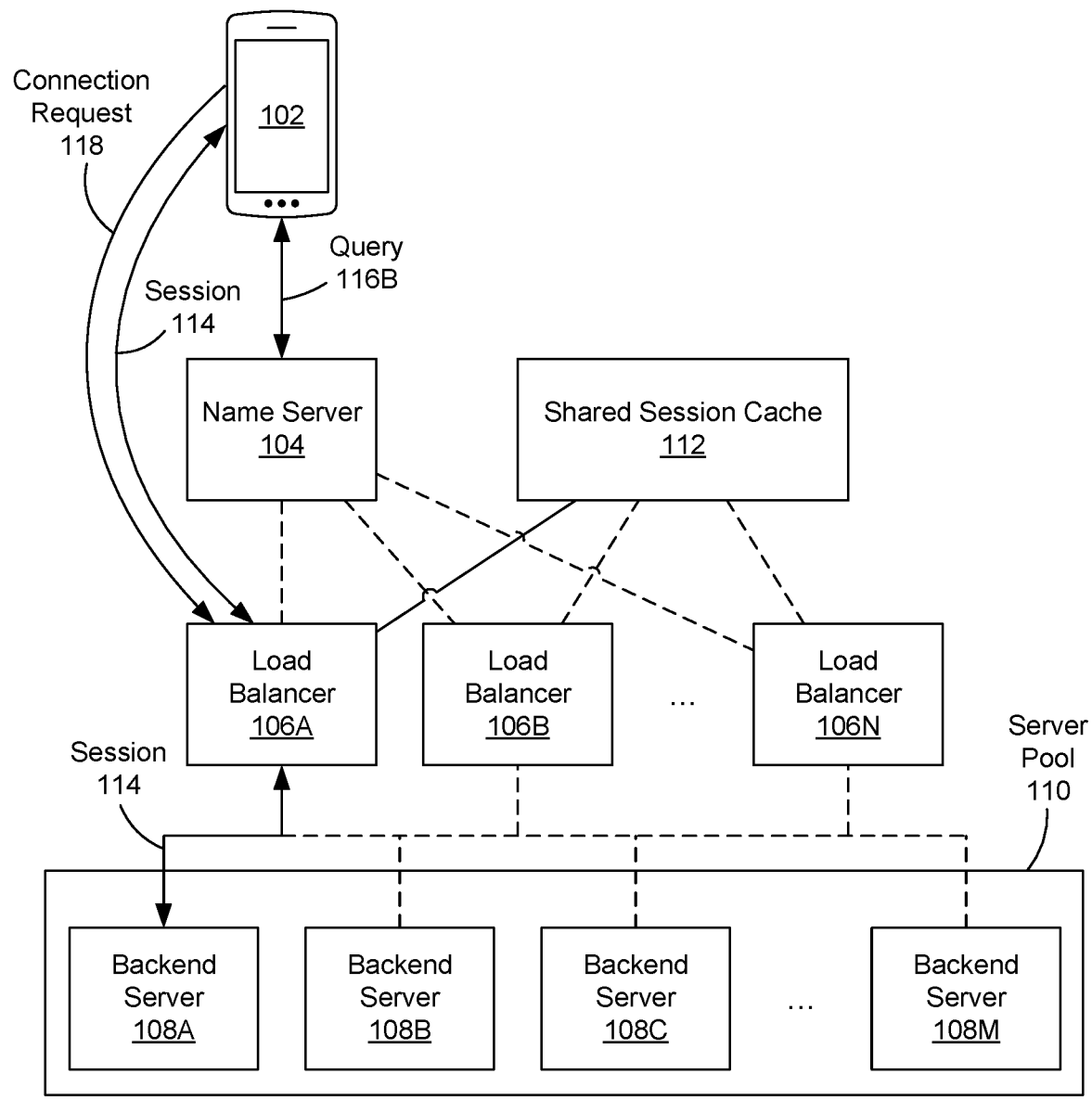

FIGS. 1A and 1B depict an example network environment in which a client device 102 can be directed by a name server 104 to one of multiple load balancers 106, which can connect the client device 102 to a backend server 108 of a server pool 110. A shared session cache 112 can be accessed and contributed to by each of the multiple load balancers 106, such that any of the load balancers 106 can determine from the shared session cache 112 whether a client device 102 is already associated with a particular backend server 108 of the server pool 110 during a session 114 and should be routed to that particular backend server 108 again to continue the session 114.

A client device 102 can be any device that can connect to a data network, such as the Internet. For example, a client device 102 can be a smart phone, a cellular phone, a personal digital assistant (PDA), a personal computer (PC), a laptop, a desktop, a workstation, a media player, a tablet, a gaming device, a smart watch, or any other type of computing or communication device.

A server pool 110 can be a group of individual backend servers 108 that each offer the same data and/or services to client devices 102. The server pool 110 can be arranged as a server farm or any other collection of backend servers 108. In some examples, the backend servers 108 in the server pool 110 can be located at the same location. However, in other examples, the backend servers 108 in the server pool 110 can be distributed across multiple locations, such as at two or more different data centers.

A client device 102 can connect to a backend server 108 in the server pool 110 through a load balancer 106 as described herein to access data and/or services via a website, an application, or any other interface. The services can be account management services, communication services, media services, shopping services, and/or any other types of services that rely at least in part on persistent sessions 114 with client devices 102. For example, the backend servers 108 in the server pool 110 can provide a website and/or a backend for a mobile application through which users of client devices 102 can manage a user account with a telecommunication provider, a bank, a merchant, or any other entity. As another example, the backend servers 108 in the server pool 110 can provide a website and/or a backend for a mobile application through which users of client devices 102 can purchase goods or services. As yet another example, the backend servers 108 in the server pool 110 can provide a website and/or a backend for a mobile application through which client devices 102 can download or stream movies, music, or other media.

Different backend servers 108 in the server pool 110 can each be associated with a unique Internet Protocol (IP) address. The IP addresses associated with the backend servers 108 can be private IP addresses that may not be known to client devices 102. However, the data and/or services provided by the backend servers 108 can be associated with a publicly available identifier, such as a hostname or Uniform Resource Locator (URL), such that a client device 102 can use that publicly available identifier to access the data and/or services via a name server 104 and a load balancer 106 as described below.

Load balancers 106 can be used to distribute traffic from multiple client devices 102 among the multiple backend servers 108 in the server pool 110. For examples, load balancers 106 can be used to distribute traffic from client devices 102 among backend servers 108 in a server pool 110 when a service provider expects that a single backend server 108 may be likely to become overloaded with traffic from multiple client devices 102, and that a better user experience may be provided if traffic from multiple client devices 102 is distributed by the load balancers 106 among multiple backend servers 108 in a server pool 110 that host identical resources.

Any number of load balancers 106 can be present in the network environment, and a network operator can scale the network's load balancing capacity up or down by adding or removing individual load balancers 106 at any time. In some examples, the load balancers 106 can be physical hardware elements. However, in other examples, the load balancers 106 can be virtual instances that can be created or destroyed on one or more network servers as needed to handle changing traffic loads. Although multiple load balancers 106 can be present in the network environment, in some examples each load balancer 106 can be uniquely identified by a distinct Virtual IP (VIP) address. In other examples, multiple load balancers 106 can share a common VIP address, and an edge router or other network element can route traffic to different load balancers 106 associated with the common VIP address using Equal Cost Multiple Path (ECMP) routing or any other process.

A name server 104 can be associated with a particular hostname through which client devices 102 can access the data and/or services provided by the backend servers 108 of the server pool 110. For example, a hostname can be a domain name that can be included in a URL. The name server 104 can receive queries 116 from client devices 102 that request resolution of that hostname to an IP address. In some examples, the name server 104 can be referred to as a Domain Name System (DNS) server or a Global Traffic Manager (GTM).

In some examples, the name server 104 can be in at least occasional communication with the load balancers 106 to determine which load balancers 106 are available to handle traffic from client devices 102. Accordingly, in response to a query 116, the name server 104 can select one of the available load balancers 106 and return the VIP address associated with the selected load balancer 106 to the client device 102.

In some examples, a name server 104 can maintain a list of load balancers 106 that are known to be online and working properly. For example, the name server 104 can update the list by periodically polling load balancers 106 to retrieve their status, or update the list based on regular or irregular status updates provided by load balancers 106. The name server 104 can accordingly use the list to select an available load balancer 106 and return its VIP address to a client device 102 in response to a query 116. In other examples, the name server 104 can attempt to contact one more load balancers 106 when it receives a new query 116, and can then responds to the query 116 with the VIP address of a load balancer 106 that it was able to contact.

By tracking which load balancers 106 are available, if a particular load balancer 106 is taken offline, is overloaded, or experiences other issues, the name server 104 can avoid providing that load balancer's VIP address to client devices 102, and can instead provide a VIP address of another load balancer 106 that is known to be available. Similarly, if a new load balancer 106 is added to the network environment, the name server 104 can begin providing that new load balancer's VIP to client devices 102 in response to queries 116. The name server can use random selection, round robin algorithms, or any other selection process to select a particular available load balancer 106 for a client device 102, and return that selected load balancer's VIP address to the client device 102. The name server 104 can therefore distribute traffic from client devices 102 among multiple load balancers 106 that are determined to be available, even though individual load balancers 106 can be added or removed from the network environment at any time.

In other examples, the name server 104 can have or be linked to an edge router (not shown) that tracks which load balancers 106 are available and can distribute traffic among the available load balancers 106. In these examples, the load balancers 106 may share a common VIP address, but the edge router can distribute traffic sent to that VIP address among the available load balancers 106 using ECMP or any other routing procedure. Accordingly, in these examples the name server 104 can provide a VIP address for the edge router to a client device 102 in response to a query 116 such that the client device 102 can contact the edge router to be connected to a load balancer 106, or the name server 104 can directly pass a client device's connection request 118 to a hostname to an edge router that can select a load balancer 106 for the client device 102.

As discussed above, a client device 102 can attempt to reach resources hosted by the backend servers 108 of the server pool 110 by sending a query 116 to the name server 104 associated with a corresponding hostname. In response to the query 116, the name server 104 can return a VIP address associated with a load balancer 106. The client device 102 can send a connection request 118 to the load balancer 106 using the provided VIP address to initiate a connection to access the service. For example, the client device 102 can use the VIP address to send a connection request 118 to establish a TCP connection with the load balancer 106 through which it can send Hypertext Transfer Protocol (HTTP) requests, such as HTTP GET requests and HTTP POST requests.

When a client device 102 connects to a particular load balancer 106, the load balancer 106 can select a backend server 108 in the server pool 110 and establish a connection with the backend server 108 for transmitting traffic to and from the client device 102. As will be described in more detail below, the load balancer 106 can consult a shared session cache 112 to determine if a specific backend server 108 is already associated with the client device 102, and if so connect the client device 102 to the specific backend server 108 identified in the shared session cache 112. However, if the shared session cache 112 does not indicate that a specific backend server 108 is already associated with the client device 102, the load balancer 106 can select a backend server 108 from the server pool 110 for the client device 102 using a selection process, such as by determining which backend server 108 in the server pool 110 has the most available resources, by determining if a candidate backend server 108 in the server pool 110 has sufficient resources to service the client device 102, by selecting a backend server 108 from the server pool 110 at random, by using a round robin procedure to cycle through backend servers 108 in the server pool 110 for each new client device 102, or by using any other selection process. When the load balancer 106 selects a new backend server 108 for a client device 102, the load balancer 106 can create an entry in the shared session cache 112 identifying the backend server 108 in association with the client device 102. Example entries in a shared session cache 112 are shown in FIG. 2, and are discussed further below with reference to that figure.

In some examples, a first connection can be established between the client device 102 and the load balancer 106, while a second connection can be established between the load balancer 106 and a selected backend server 108. In these examples, data can be exchanged between the client device 102 and the selected backend server 108 through both the first connection and the second connection using the load balancer 106 as an intermediary. In other examples, a load balancer 106 can serve as a pass-through for a single connection established end-to-end between the client device 102 and a selected backend server 108.

When the client device 102 is connected to a selected backend server 108 via a load balancer 106, the client device 102 and the selected backend server 108 can establish a session 114. A session 114 can be a persistent session during which the client device 102 and/or the backend server 108 maintains state information about the session 114. For example, the session 114 can be a persistent application layer session at Layer 7 of the Open Systems Interconnection (OSI) model.

A backend server 108 can store information about a session 114 with a client device 102, such as maintaining the contents of an electronic shopping cart or otherwise tracking a user's interactions with the services provided by the backend server 108. In some examples, a user of the client device 102 may use a username and password, or other credentials, to log in to an account at the backend server 108 to establish a persistent session 114. In some examples, the selected backend server 108 can place a cookie or other data at the client device 102 so the backend server 108 can identify the client device 102 as the client device 102 interacts with the services provided by the backend server 108, whether or not the client device 102 has provided credentials to log into a user account.

As discussed above, each backend server 108 in the server pool 110 can store the same underlying data and can provide the same services to client devices 102. Accordingly, it may not matter to a client device 102, or user of the client device 102, which backend server 108 a load balancer 106 selects for the client device 102 when a session 114 is first initiated. However, once a session 114 has begun and a selected backend server 108 has begun to store state information tracking the current state of the session 114, other backend servers 108 in the server pool 110 may not have access to that state information about the session 114. Accordingly, if the client device 102 is disconnected from the original backend server 108 during the session 114, such as if the client device 102 loses its network connection or if the load balancer 106 experiences an error or is taken offline, the shared session cache 112 can be used by the same or a different load balancer 106 to reconnect the client device 102 to the same backend server 108 that it was already associated with so that the existing session 114 can continue.

The shared session cache 112 can store global information about client devices 102 and which backend servers 108 in the server pool 110 load balancers 106 have selected for those client devices 102. If a load balancer 106 receives a new connection request 118 from a client device 102, it can access the shared session cache 112 to determine if the client device 102 is already associated with a particular backend server 108. If so, the load balancer 106 can select that previously associated backend server 108 and connect the client device 102 to the previously assigned backend server 108 so that a previous session 114 can continue. However, if the shared session cache 112 does not indicate that the client device 102 is already associated with a particular backend server 108, the load balancer 106 can use any other selection process to select a new backend server 108 and connect the client device 102 to the selected backend server 108 to begin a new session 114. The load balancer 106 can also make a new entry in the shared session cache 112 indicating that the client device 102 was connected to a particular backend server 108, such that if the load balancer 106 or another load balancer 106 receives a subsequent connection request 118 from the client device 102, the client device 102 can be reconnected to that particular backend server 108 based on the information in the shared session cache 112.

In some examples, the shared session cache 112 can be stored on a distinct network element that can communicate with each load balancer 106. In other examples, the shared session cache 112 can be stored in memory at one of the load balancers 106 such that it is accessible by other load balancers 106, or be mirrored and synchronized at one more network locations. In some examples, communications between the shared session cache 112 and the load balancers 106 can be encrypted.

FIGS. 1A and 1B depict an example in which a client device 102 is connected to a particular backend server 108A and is then reconnected to that particular backend server 108A to continue a session 114 based on a shared session cache 112. The particular backend server 108A, along with other backend servers 108 in a server pool 110, can provide data and/or services in association with a particular hostname or URL, such as www.example.com.

As shown in FIG. 1A, a client device 102 can submit a query 116A to a name server 104 that processes queries 116A for the hostname associated with the data and/or services provided by the backend servers 108 of the server pool 110. The name server 104 can be in communication with multiple load balancers 106 to determine which load balancers 106 are available, and can determine that load balancer 106B is available at the time the client device's query 116A is received. The name server 104 can accordingly select load balancer 106B and respond to the client device's query 116A by sending the client device 102 a unique VIP address associated with selected load balancer 106B. The client device 102 can use the provided VIP address for load balancer 106B to send a connection request 118 to establish a connection with load balancer 106B. Alternately, the name server 104 can provide a common VIP shared by multiple load balancers 106, and an edge router can route a connection request sent by the client device 102 to the common VIP to load balancer 106B.

In response to receiving the connection request 118 from the client device 102, load balancer 106B can access the shared session cache 112 and determine that the shared session cache 112 does not indicate that client device 102 is currently associated with any specific backend server 108 of the server pool 110. Accordingly, load balancer 106B can use a selection process to select backend server 108A for the client device 102, and can create a new entry in the shared session cache 112 indicating that backend server 108A is associated with client device 102. Load balancer 106B can also connect the client device 102 to backend server 108A, such that the client device 102 and the backend server 108A can begin a session 114 and exchange data through load balancer 106B. During the session 114, backend server 108A can maintain state information about the session 114.

However, at some point during the session 114 the connection between the client device 102 and backend server 108A may become interrupted. For example, the client device 102 may be a mobile phone that moves into an area with poor signal strength, causing its connection with load balancer 106B and/or backend server 108A to be terminated. As another example, load balancer 106B may experience an error, be taken offline for maintenance, or be taken offline because fewer load balancing resources are needed for current network conditions, and as such the connection between the client device 102 and the backend server 108A through load balancer 106B can be interrupted.

Client device 102 may respond to the interruption in its connection with backend server 108A by attempting to reconnect to the session 114. For example, the client device 102 may send a second query 116B to the name server 104 as shown in FIG. 1B. As before, the name server 104 can reply with a VIP address of an available load balancer 106 that the name server 104 selects. Although load balancer 106B was previously selected for client device 102 in FIG. 1A, in the example of FIG. 1B the name server 104 may instead reply with the VIP address of load balancer 106A because load balancer 106B is no longer available or because it newly selected load balancer 106A at random, using a round robin selection process, because load balancer 106A has the most available resources, or for any other reason. In other examples, name server 104 may return a common VIP shared by multiple load balancers 106, and an edge router can direct the client device's connection request 118 to load balancer 106A instead of load balancer 106B.

As shown in FIG. 1B, the client device 102 can use the provided VIP address to send a connection request 118 to establish a connection with load balancer 106A. Load balancer 106A can access the shared session cache 112, and determine that the shared session cache 112 indicates that client device 102 is already associated with backend server 108A of the server pool 110. Accordingly, rather than selecting a new backend server 108 for client device 102 that might not have state information about the previously existing session 114, load balancer 106A can connect the client device 102 to backend server 108A based on the shared session cache 112. Backend server 108A, due to its existing state information about the session 114, can continue the session 114 with the client device 102 through load balancer 106A instead of previous load balancer 106B. In some examples, despite the interruption of the previous connection, backend server 108A can identify the client device 102 and/or the state information about the existing session 114 based on a cookie stored at the client device 102 and/or other information provided by the client device 102.

FIG. 2 depicts an example of a shared session cache 112. The shared session cache 112 can have entries for connections between client devices 102 and backend servers 108. Each entry can include a source identifier 202 and a destination identifier 204. In some examples, each entry can also include one or more pieces of additional information, such as a timer 206, a forward destination identifier 208, and/or a reverse source identifier 210.

A source identifier 202 can be an identifier for a particular client device 102, such as an IP address associated with the client device 102. The destination identifier 204 can be an identifier for a backend server 108, such as an IP address associated with the backend server 108. Accordingly, when a load balancer 106 receives a new connection request 118 from a client device 102, the load balancer 106 can determine if the shared session cache 112 includes a source identifier 202 associated with that client device 102. For example, the load balancer 106 can search the source identifiers 202 in the shared session cache 112 for the client device's IP address, which the client device 102 may have provided when it contacted the load balancer 106. If such an entry exists, the load balancer 106 can find a corresponding destination identifier 204, such as an IP address, of a specific backend server 108 that is already associated with the client device 102 identified by the entry's source identifier 202, and then connect the client device 102 to that specific backend server 108.

In some examples, each entry in the shared session cache 112 can include a timer 206. The shared session cache 112 can be configured to delete entries that are older than a predetermined period of time. In some examples, an entry's timer 206 can be a counter that counts down from a default or custom value to zero, at which point the shared session cache 112 deletes the entry. In other examples, an entry's timer 206 can directly indicate a time at which the entry was created or last updated, directly indicate a time at which the entry should be deleted, or can be a counter that counts up from a time at which the entry was created or last updated. In these examples, the shared session cache 112 can periodically determine whether an entry's timer 206 indicates that the entry has expired and should be deleted, such as by checking the timer 206 against a threshold time or threshold counter value. When a load balancer 106 creates a new entry in the shared session cache 112, it can set the timer 206 to a default or custom starting value. Similarly, when a load balancer 106 consults the shared session cache 112 and finds an already existing entry for a client device 102 that has not yet been deleted, the load balancer 106 can reset that entry's timer 206 to the default or custom starting value.

When an entry's timer 206 indicates that the entry has expired, the shared session cache 112 can delete the entry. Deletion of an entry from the shared session cache 112 can reflect that a corresponding session 114 is not likely to still be ongoing, and as such a client device 102 can be directed to any of the backend servers 108 in the server pool 110 when it next attempts to access the resources hosted by the backend servers 108. Accordingly, if a load balancer 106 receives a connection request 118 from a client device 102 for which no entry is found in the shared session cache 112, because it never existed or was deleted based on an expired timer 206, the load balancer 106 can select a new backend server 108 for the client device 102 and create a new entry for that relationship in the shared session cache 112.

In some examples, entries in the shared session cache 112 can include a forward destination identifier 208 and/or a reverse source identifier 210. A forward destination identifier 208 can be an identifier exposed to the client device 102 for the connection between the client device 102 and the backend server 108, such as a unique or shared VIP address of a load balancer 106. A reverse source identifier 210 can be an identifier by which the backend server 108 can identify the client device 102 in its communications with a load balancer 106. For example, the reverse source identifier 210 can be a Source Network Address Translation (SNAT) identifier provided by a load balancer 106 to identify a client device 102 to a backend server 108. In some examples, when a new load balancer 106 takes over a session 114 from a previous load balancer 106 as shown in FIG. 1B, the new load balancer 106 can update and/or use one or more of the forward destination identifier 208 or the reverse source identifier 210 in the shared session cache 112 when reconnecting the client device 102 and the backend server 108 to continue the session 114.

In some examples, each load balancer 106 can additionally maintain its own local cache that stores information about connections it has made between client devices 102 and backend servers 108. The local cache can contain the same or similar types of information as the shared session cache 112. When a load balancer 106 receives a new connection from a client device 102, the load balancer 106 may first check its own local cache to determine if the load balancer 106 has already associated the client device 102 with a particular backend server 108. If so, the load balancer 106 can reconnect the client device 102 with that particular backend server 108, and also reset a timer 206 in a corresponding entry in the shared session cache 112 so that other load balancers 106 can access the most up-to-date information.

If a load balancer's own local cache does not have an entry for a client device 102 that has connected to the load balancer 106, the load balancer 106 can check the shared session cache 112 for an entry associated with the client device 102 as discussed above. If such an entry exists in the shared session cache 112, the load balancer 106 can update that entry's timer 206 in the shared session cache 112 and create a corresponding entry in the load balancer's local cache. If no such entry exists in the shared session cache 112, the load balancer 106 can create new entries in both its local cache and the shared session cache 112.

In some examples, the name server 104, the load balancers 106, and the shared session cache 112 can be, or be hosted on, a plurality of different network elements. In other examples, some or all of the name server 104, the load balancers 106, and the shared session cache 112 can be, or be hosted on, the same network element. For example, a single network element can be provided that can host multiple instances of load balancers 106, as well as storing the shared session cache 112. In some examples, such a single network element can also include a name server 104 configured to track the currently available instances of virtual load balancers 106 and to distribute client devices 102 among those virtual load balancers 106.

In some examples, when a new backend server 108 is added to the server pool 110, information about the new backend server 108 can be provided to the load balancers 106 associated with the shared session cache 112 substantially simultaneously or within a threshold period of time. Accordingly, if a client device 102 is connected to a particular backend server 108 by a first load balancer 106, but then should be reconnected to that particular backend server 108 by a second load balancer 106 based on an entry in the shared session cache 112, the second load balancer 106 can use the information about the new backend server 108 such that it can successfully connect the client device 102 to the new backend server 108.

In some examples, when a backend server 108 is removed from the server pool 110, such as if it fails or experiences an error, or is manually taken offline, entries in the shared session cache 112 associated with that backend server 108 can be deleted. This can prevent load balancers 106 from attempting to reconnect client devices 102 to a backend server 108 that has gone offline based on existing entries in the shared session cache 112. For example, a load balancer 106 that had been in communication with a particular backend server 108, but can no longer reach that backend server 108, can determine that the backend server 108 is no longer accessible. The load balancer 106 can accordingly instruct the shared session cache 112 to delete entries associated with that backend server 108, such that the load balancer 106 or other load balancer 106 does not try to reconnect client devices 102 to the now-offline backend server 108 based on the shared session cache 112, and would instead select new backend servers 108 for the client devices 102. The load balancer 106 may also delete similar information about the now-offline backend server 108 from its own local cache. As another example, if a backend server 108 is manually taken offline by an administrator, the administrator can submit instructions that cause entries in the shared session cache 112 associated with the now-offline backend server 108 to be deleted.

In some examples, the network environment can allow use of the shared session cache 112 to be enabled and/or disabled with respect to one or more VIPs. For example, a user interface can allow an administrator to turn off use of the shared session cache 112 for a VIP, such that load balancers 106 associated with that VIP would instead use their own local caches to connect client devices 102 to backend servers 108 without attempting to consult the shared session cache 112. This option can, for example, be of use if the shared session cache 112 is undergoing maintenance or is otherwise offline. The user interface can also allow an administrator to turn on use of a shared session cache 112 for a VIP, and/or perform other operations such as associating load balancers 106 with VIPs, associating load balancers 106 with the shared session cache 112, associating load balancers 106 with the server pool 110, adding backend servers 108 to the server pool 110, removing backend servers 108 from the server pool 110, and/or any other operation to configure the network environment.

Example Architecture

Figure 3:
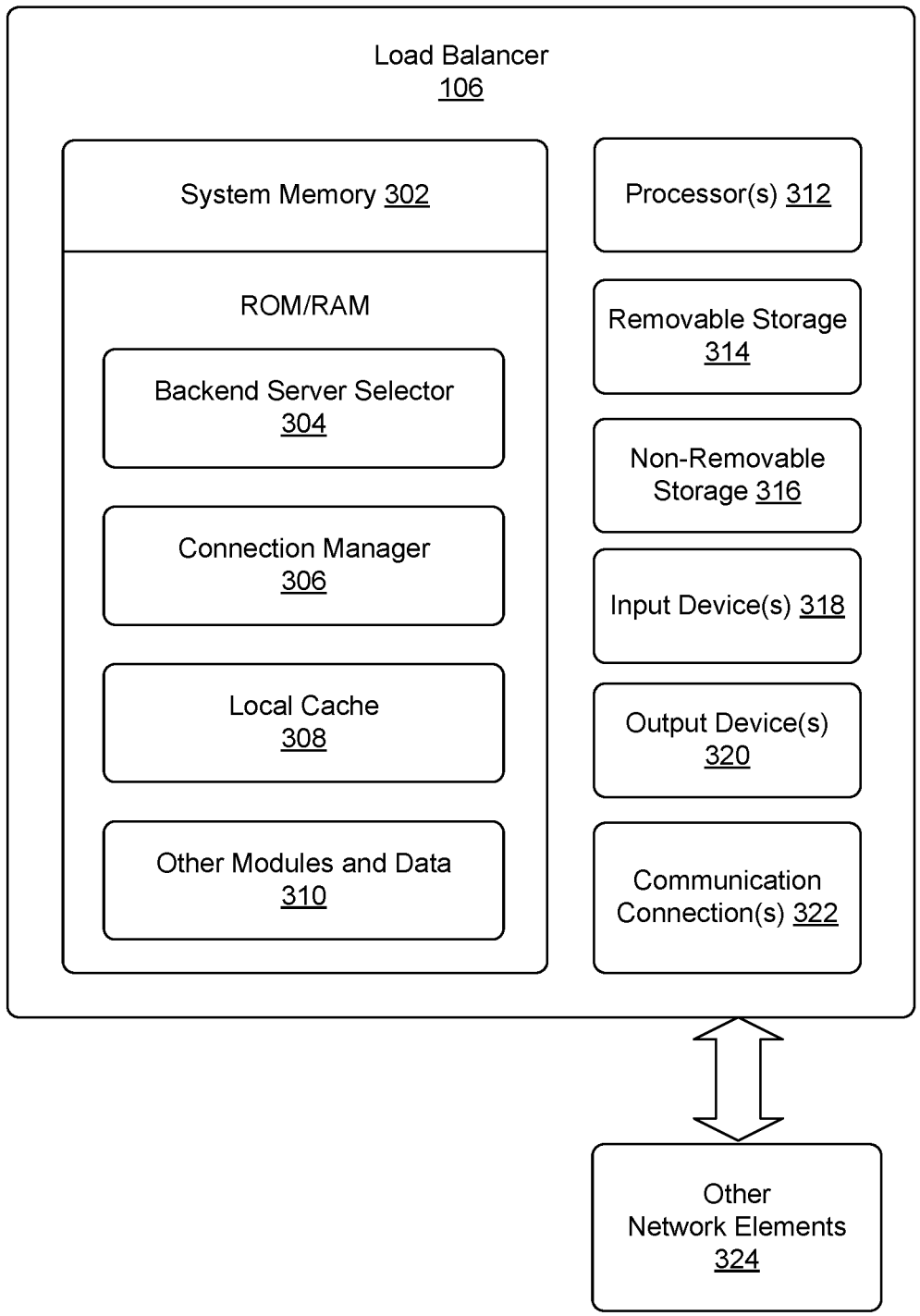
FIG. 3 depicts an example system architecture for a load balancer.

FIG. 3 depicts an example system architecture for a load balancer 106. A load balancer 106 can have a system memory 302 that stores data for the load balancer 106, including a backend server selector 304, a connection manager 306, a local cache 308, and/or other modules and data 310.

In some examples, the load balancer 106 can be a server or other element that hosts one or more instances of the backend server selector 304, the connection manager 306, and/or the local cache 308 in the system memory 302, such that the load balancer 106 can serve as one or more virtual load balancers 106 that each have their own backend server selector 304, connection manager 306, and/or local cache 308. For example, the load balancer 106 shown in FIG. 3 can be an elastic server that can create or destroy instances of the backend server selector 304, the connection manager 306, and/or the local cache 308 in the system memory 302 to adjust the number of available virtual load balancers 106 as traffic or network demands change. In other examples, the load balancer 106 can be a server or other element that serves as a single physical load balancer 106.

In various examples, system memory 302 can be volatile (such as RAM), nonvolatile (such as ROM, flash memory, etc.), or some combination of the two. Example system memory 302 can include one or more of RAM, ROM, EEPROM, a Flash Memory, a hard drive, a memory card, optical storage, or any other medium.

A backend server selector 304 can be configured select a backend server 108 from a server pool 110 for a connection from a client device 102. For example, the backend server selector 304 can determine from the local cache 308 and/or a shared session cache 112 stored in memory in another device, whether or not a client device 102 is already associated with a specific backend server 108 of a server pool. If the client device 102 is already associated with a specific backend server 108, the backend server selector 304 can instruct the connection manager 306 to connect the client device 102 to that specific backend server 108. The backend server selector 304 can update the local cache 308 and/or the shared session cache 112, such as resetting a timer 206 in the shared session cache 122.

However, if the local cache 308 and the shared session cache 112 indicate that a connected client device 102 is not already associated with a backend server 108, the backend server selector 304 can perform a backend server selection process to choose a backend server 108 for the client device 102. For example, the backend server selector 304 can be configured to use random selection or a round robin method to select a backend server 108, select a backend server 108 based on available resources of the backend servers 108, or use any other selection process to select a backend server 108 for a client device 102 that is not already associated with a backend server 108. The backend server selector 304 can instruct the connection manager 306 to use the selected backend server 108 for the client device 102, and can create corresponding entries in the local cache 308 and shared session cache 112.

The connection manager 306 can create new connections between client devices 102 and backend servers 108 selected by the backend server selector 304. For example, the connection manager 306 can create TCP connections between a client device 102 and the load balancer 106 as well as between the load balancer 106 and a backend server 108, or assist in creating a TCP connection between the client device 102 and the backend server 108 that passes through the load balancer 106. The connection manager 306 can accordingly manage such existing connections, for example by routing data between a client device 102 and a backend server 108 during a session 114 once they have been connected.

The local cache 308 can store information about connections that are, or have been, managed by the connection manager 306. In some examples, the backend server selector 304 can initially determine from the local cache 308 whether a client device 102 is already associated with a specific backend server 108. If so, the backend server selector 304 can instruct the connection manager 306 to reconnect a client device 102 to that specific backend server 108, and can update a corresponding entry in the shared session cache 112. If the local cache 308 does not indicate that a client device 102 is already associated with a specific backend server 108, but the shared session cache 112 does reflect an existing association between a client device 102 and a specific backend server 108, the backend server selector 304 can instruct the connection manager 306 to connect the client device 102 to that specific backend server 108, and can create a corresponding entry in the local cache 308. If neither the local cache 308 nor the shared session cache 112 indicate that a client device 102 is associated with a backend server 108, the backend server selector 304 can select a backend server 108 for the client device 102, instruct the connection manager 306 to connect the client device 102 to the selected backend server 108, and create entries in the local cache 308 and the shared session cache 112 indicating that the client device 102 is associated with the selected backend server 108.

The other modules and data 310 can be utilized by the load balancer 106 to perform or enable performing any action taken by the load balancer 106. The other modules and data 310 can include a platform and applications, and data utilized by the platform and applications.

In some examples, the other modules and data 310 can include configuration settings and/or connection information related to the shared session cache 112 that assist the load balancer 106 in communicating with the shared session cache 112. For example, the load balancer 106 can store identifiers for the shared session cache 112, such as an IP address and/or port number, such that the load balancer 106 can use the identifiers to contact the shared session cache 112. As another example, when communications between the shared session cache 112 and load balancers 106 are to be encrypted, the load balancer 106 can store information about one or more encryption and/or decryption algorithms that are to be used when communicating with the shared session cache 112.

The load balancer 106 can also include processor(s) 312, removable storage 314, non-removable storage 316, input device(s) 318, output device(s) 320, and/or communication connections 322 for communicating with other network elements 324.

In some embodiments, the processor(s) 312 can be a central processing unit (CPU), a graphics processing unit (GPU), both CPU and GPU, or other processing unit or component known in the art.

The load balancer 106 can also include additional data storage devices (removable and/or non-removable) such as, for example, optical disks. Such additional storage is illustrated in FIG. 3 by removable storage 314 and non-removable storage 316. Computer storage media may include volatile and nonvolatile, removable and non-removable media implemented in any method or technology for storage of information, such as computer readable instructions, data structures, program modules, or other data. System memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile discs (DVD) or other optical storage, or any other medium which can be used to store the desired information and which can be accessed by the load balancer 106. Any such computer-readable storage media can be part of the load balancer 106. In various examples, any or all of system memory 302, removable storage 314, and non-removable storage 316, store programming instructions which, when executed, implement some or all of the herein-described operations of the load balancer 106.

In some examples, the load balancer 106 can also have input device(s) 318, such as a keyboard, a mouse, a touch-sensitive display, voice input device, etc., and/or output device(s) 320 such as a display, speakers, a printer, etc. These devices are well known in the art and need not be discussed at length here.

The load balancer 106 can also contain communication connections 322 that allow the load balancer 106 to communicate with other network elements 324, such as client devices 102, name servers 104, the shared session cache 112, and/or backend servers 108 in a server pool 110.

In some examples, the load balancer 106 can include one or more Application Specific Integrated Circuit (ASIC) chips that can perform one or more of the operations associated with the load balancer 106, including the operations described herein. For example, processors 312 or communication connections 322 of the load balancer 106 can be, or include, ASIC chips. While a load balancer 106 can perform any of the operations described herein via the execution of computer-executable programming instructions as described above, in some examples specific operations of a load balancer 106 can be hard-wired into circuitry of ASIC chips such that, in some cases, the operations can be performed more quickly and/or more efficiently than through the execution of computer-executable programming instructions in a software layer above an operating system layer above a machine code layer above a general processor layer.

Figure 4:
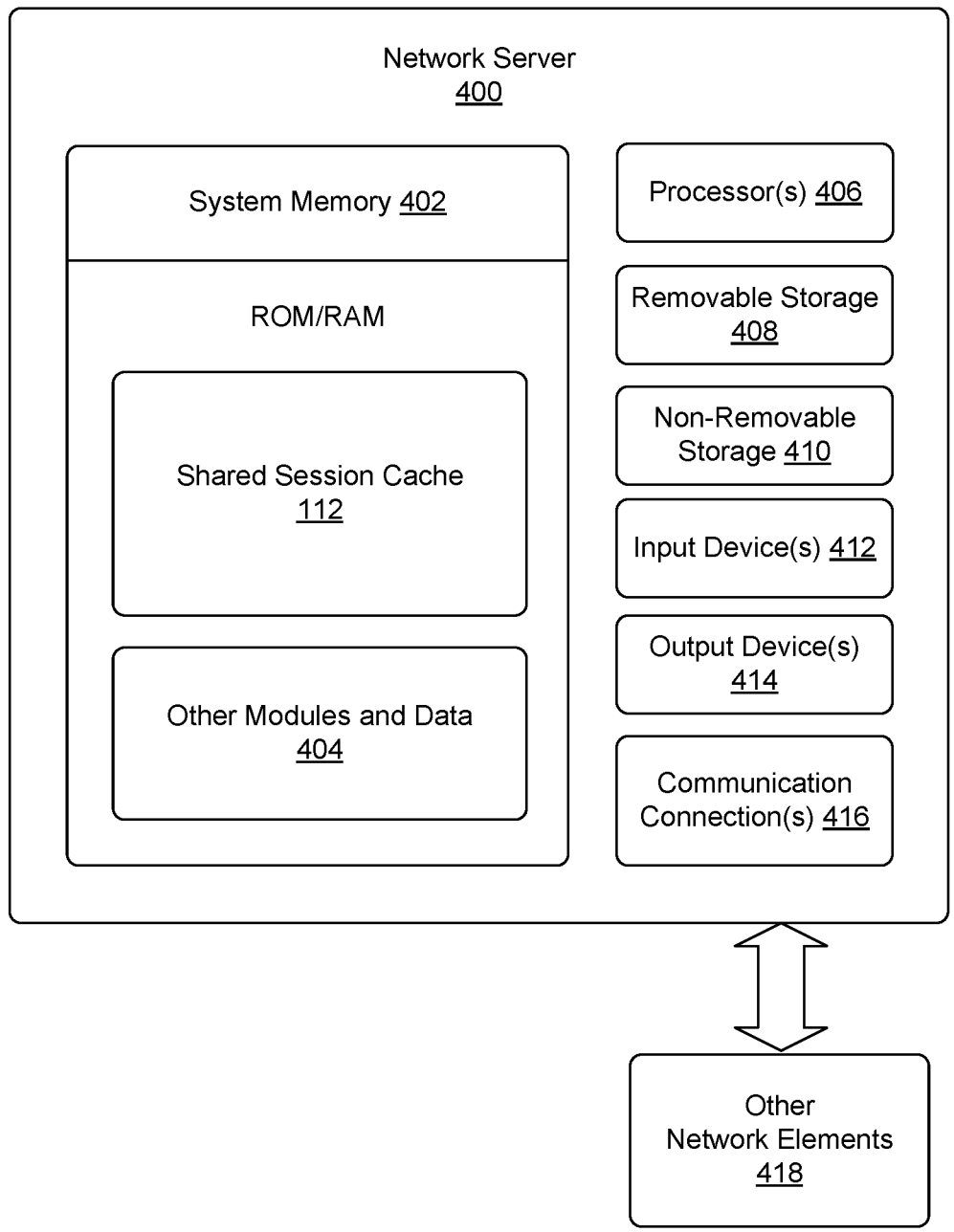
FIG. 4 depicts an example system architecture for a network server that can store a shared session cache.

FIG. 4 depicts an example system architecture for a network server 400 that have a system memory 402 that stores data for the shared session cache 112 described above and/or other modules and data 404.

In various examples, system memory 402 can be volatile (such as RAM), nonvolatile (such as ROM, flash memory, etc.), or some combination of the two. Example system memory 402 can include one or more of RAM, ROM, EEPROM, a Flash Memory, a hard drive, a memory card, optical storage, or any other medium.

In some examples, the load balancers 106 described herein can access the shared session cache 112 stored in system memory 402 through a network connection to the network server 400 shown in FIG. 4. In other examples, the network server 400 can itself be a load balancer 106, such as the load balancer 106 shown in FIG. 3, such that the shared session cache 112 is stored in system memory 302 of the load balancer 106 and is accessible to other load balancers 106 present in the network.

The other modules and data 404 can be utilized by the network server 400 to perform or enable performing any action taken by the network server 400. The other modules and data 404 can include a platform and applications, and data utilized by the platform and applications.

The network server 400 can also include processor(s) 406, removable storage 408, non-removable storage 410, input device(s) 412, output device(s) 414, and/or communication connections 416 for communicating with other network elements 418.

In some embodiments, the processor(s) 406 can be a central processing unit (CPU), a graphics processing unit (GPU), both CPU and GPU, or other processing unit or component known in the art.

The network server 400 can also include additional data storage devices (removable and/or non-removable) such as, for example, optical disks. Such additional storage is illustrated in FIG. 4 by removable storage 408 and non-removable storage 410. Computer storage media may include volatile and nonvolatile, removable and non-removable media implemented in any method or technology for storage of information, such as computer readable instructions, data structures, program modules, or other data. System memory 402, removable storage 408 and non-removable storage 410 are all examples of computer-readable storage media. Computer-readable storage media include, but are not limited to, RAM, ROM, EEPROM, flash memory or other memory technology, CD-ROM, digital versatile discs (DVD) or other optical storage, or any other medium which can be used to store the desired information and which can be accessed by the network server 400. Any such computer-readable storage media can be part of the network server 400. In various examples, any or all of system memory 402, removable storage 408, and non-removable storage 410, store programming instructions which, when executed, implement some or all of the herein-described operations of the network server 400.

In some examples, the network server 400 can also have input device(s) 412, such as a keyboard, a mouse, a touch-sensitive display, voice input device, etc., and/or output device(s) 414 such as a display, speakers, a printer, etc. These devices are well known in the art and need not be discussed at length here.

The network server 400 can also contain communication connections 416 that allow the network server 400 to communicate with other network elements 418, such as load balancers 106.

Example Operations

Figure 5:
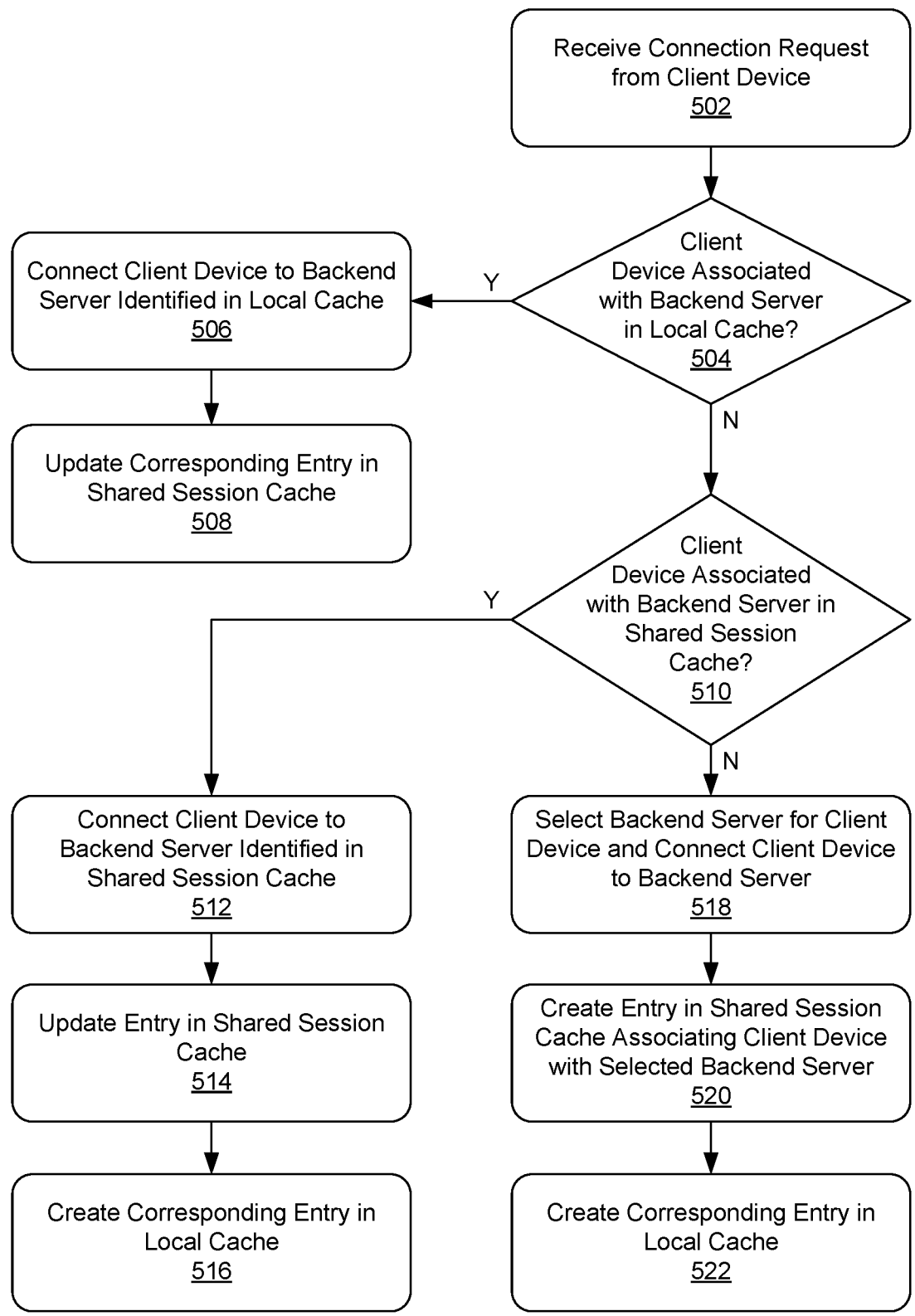
FIG. 5 depicts an example process involving a shared session cache by which a load balancer can select a backend server for a client device.

FIG. 5 depicts an example process involving a shared session cache 112 by which a load balancer 106 can select a backend server 108 for a client device 102. The load balancer 106 may be one of many load balancers 106 that are configured to distribute traffic from client devices 102 among multiple backend servers 108 in a server pool 110.

At operation 502, the load balancer 106 can receive a connection request 118 from a client device 102. For example, the load balancer 106 may be associated with a VIP address provided by a name server 104 to the client device 102 in response to a query 116 indicating a hostname associated with the load balancer 106 or the backend servers 108 of the server pool 110, and the client device 102 can use the provided VIP address to send a connection request 118 to the load balancer 106 to initiate a connection with the load balancer 106. In some examples, the connection between the client device 102 and the load balancer 106 can be a TCP connection or any other type of network connection.

At operation 504, the load balancer 106 can determine if its local cache 308 contains information associating the client device 102 with a backend server 108 of the server pool 110. For example, the load balancer 106 can search the local cache 308 for an entry associated with an IP address of the client device 102. If the local cache 308 does associate the client device 102 with a particular backend server 108, the load balancer 106 can move to operation 506 and attempt to connect the client device 102 to the backend server 108 identified in the local cache 308. For example, the load balancer 106 can attempt to establish a TCP connection with the backend server 108 for the client device 102. When the load balancer 106 is able to connect the client device 102 to a specific backend server 108 to which it was previously connected, as identified in the local cache 308, the client device 102 and the backend server 108 may be able to continue a previously existing session 114. However, if the backend server 108 identified in the load balancer's local cache 308 is offline or is otherwise unavailable, the load balancer 106 can use its load balancing algorithms to select a new backend server 108 that is available for the client device 102, update its local cache 308 to associate the client device 102 with the newly selected backend server 108, and connect the client device 102 to the newly selected backend server 108 at operation 506.

At operation 508, the load balancer 106 can also update a corresponding entry for the association between the client device 102 and the backend server 108 in the shared session cache 112. For example, if the load balancer 106 successfully connected the client device 102 to a backend server 108 identified in its local cache 308, the load balancer 108 can also reset a timer 206 in a corresponding entry in the shared session cache 112. If no such corresponding entry exists in the shared session cache 112, the load balancer 106 can create one at operation 508. If the load balancer 106 instead connected the client device 102 to a new backend server 108 during operation 506 because a previously associated backend server 108 was no longer available, the load balancer 106 can update the shared session cache 112 during operation 508 to reflect the new relationship between the client device 102 and the new backend server 108. The load balancer 106 can also remove information in the shared session cache 112, if any, that associated the client device 102 with the previous backend server 108 that is now unavailable.

If at operation 504 the load balancer 106 does not find information associating the client device 102 with a backend server 108 in its local cache 308, the load balancer 106 can determine at operation 510 whether the shared session cache 112 contains an entry associating the client device 102 with a backend server 108. For example, if the client device 102 had previously been connected to a backend server 108 by a different load balancer 106, the shared session cache 112 may still reflect that relationship even though the current load balancer's local cache 308 does not. In some examples, at operation 510 the load balancer 106 can search the shared session cache 112 for an entry containing the client device's IP address as a source identifier 202.

If at operation 510 the load balancer 106 determines that the shared session cache 112 does contain an entry indicating that the client device 102 was previously associated with a particular backend server 108, the load balancer 106 can move to operation 512 and attempt to connect the client device 102 to the backend server 108 identified in the shared session cache 112. For example, the load balancer 106 can attempt to establish a TCP connection with the backend server 108 for the client device 102. When the load balancer 106 is able to connect the client device 102 to a specific backend server 108 to which it was previously connected, as identified in the shared session cache 112, the client device 102 and the backend server 108 may be able to continue a previously existing session 114. However, if the backend server 108 identified in the shared session cache 112 is offline or is otherwise unavailable, the load balancer 106 can use its load balancing algorithms to select a new backend server 108 that is available for the client device 102, and connect the client device 102 to the newly selected backend server 108 at operation 512.

At operation 514, the load balancer 106 can update the entry for the client device's connection to the backend server 108 in the shared session cache 112. For example, if the load balancer 106 successfully connected the client device 102 to a backend server 108 identified in the shared session cache 112, the load balancer 108 can also reset a timer 206 in that entry in the shared session cache 112. If the load balancer 106 instead connected the client device 102 to a new backend server 108 during operation 512 because a previously associated backend server 108 was no longer available, the load balancer 106 can update the shared session cache 112 during operation 512 to reflect the new relationship between the client device 102 and the new backend server 108. The load balancer 106 can also remove information in the shared session cache 112 that associated the client device 102 with the previous backend server 108 that is now unavailable.

At operation 516, the load balancer 106 can also create a corresponding entry in its own local cache 308. For example, if the load balancer 106 successfully connected the client device 102 to the backend server 108 first identified in the shared session cache 112, the load balancer 106 can create an entry in its local cache 308 that associates the client device 102 with that backend server 108. However, if the backend server 108 first identified in the shared session cache 112 was unavailable and the load balancer 106 selected a new backend server 108 for the client device and updated the shared session cache 112 accordingly, the load balancer 102 can create a corresponding entry in its local cache 308 that associates the client device 102 with the new backend server 108 during operation 516.

However, if at operation 510 the load balancer 106 determines that the shared session cache 112 does not contain an entry associating the client device 102 with a backend server 108, the load balancer 106 can move to operation 518 and select a backend server 108 for the client device 102. For example, the client device 102 may not have previously been associated with a backend server 108. As another example, although the client device 102 may have been previously associated with a backend server 108, information about that relationship may have deleted from the shared session cache 112 due to the expiration of a timer 206 such that the shared session cache 112 does not currently associate the client device 102 with any of the backend servers 108.

At operation 518, the load balancer 106 can use random selection, a round robin selection method, a selection method that considers the available resources of one or more backend server 108, or any other selection method to choose a backend server 108 for the client device 102. The load balancer 106 can also connect the client device 102 the selected backend server 108. For example, the load balancer 106 can establish a TCP connection with the selected backend server 108 for the client device 102.

At operation 520, the load balancer 106 can create an entry in the shared session cache 112 that associates the client device 102 with the selected backend server 108. Accordingly, any load balancer 106 that is connected to the client device 102 in the future, before the entry's timer expires, can find the entry at operation 510 and reconnect the client device 102 to the selected load balancer 106 at operation 512. At operation 522, the load balancer 106 can also create a corresponding entry in its own local cache 308.

Figure 6:
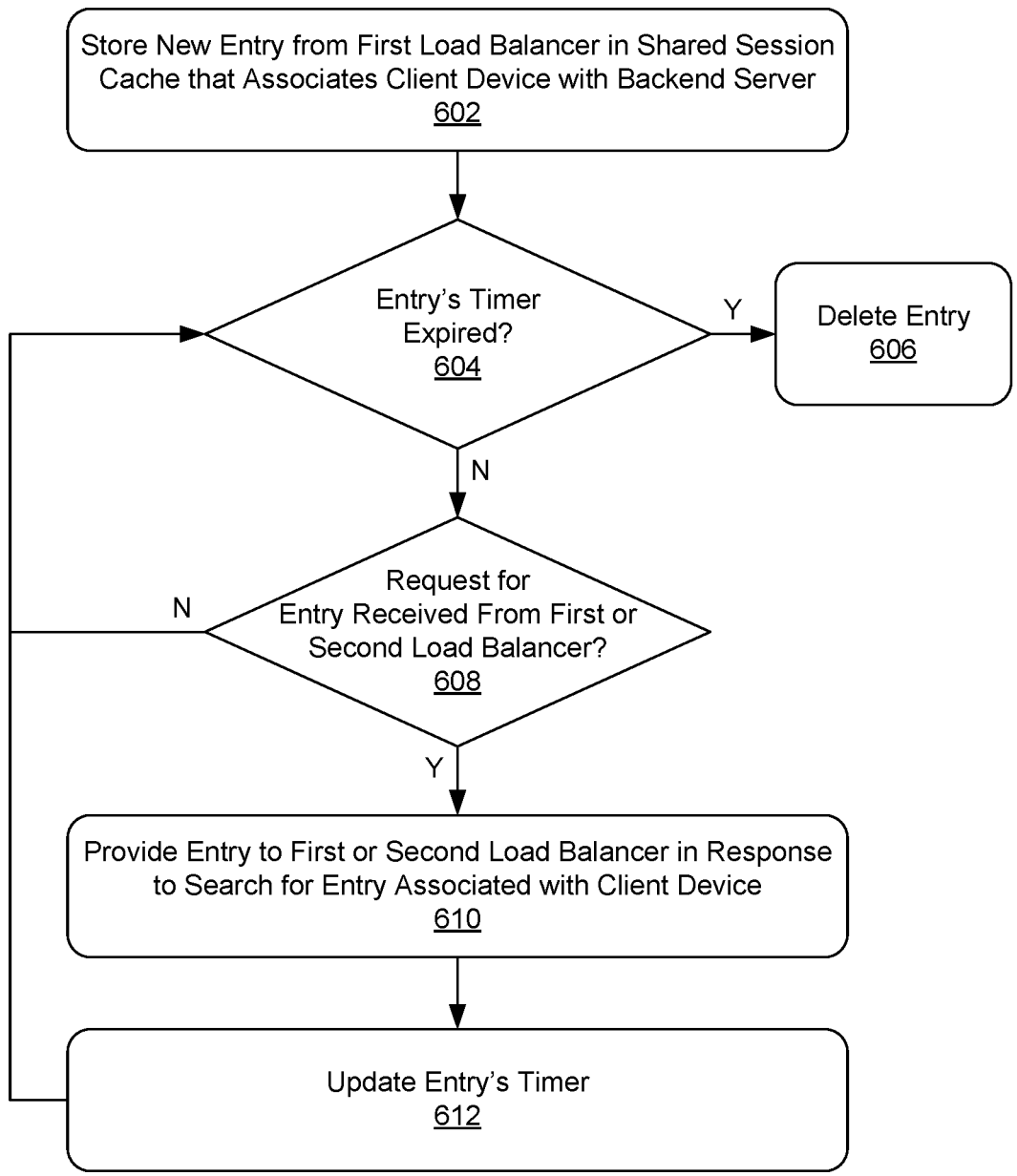
FIG. 6 depicts an example process by which a shared session cache can add, update, and/or delete entries associating client devices with backend servers of a server pool.

FIG. 6 depicts an example process by which a shared session cache 112 can add, update, and/or delete entries associating client devices 102 with backend servers 108 of a server pool 110, based on input from one or more load balancers 106. Although the operations of FIG. 6 are described as being performed by the shared session cache 112, in some examples they can be implemented at least in part by a network server 400 or other element that stores the shared session cache 112 in memory.

At operation 602, the shared session cache 112 can receive and store a new entry from a first load balancer 106 identifying an association between a client device 102 and a backend server 108. For example, the first load balancer 106 may provide a source identifier 202 for the client device 102 and a destination identifier 204 for the backend server 108, such as their IP addresses. The first load balancer 106 may also set a timer 206 associated with the entry in the shared session cache 112.

At operation 604, the shared session cache 112 can determine if the entry's timer 206 has expired. If the entry's timer 206 has expired, the shared session cache 112 can delete the entry at operation 606.

However, if the entry's timer 206 has not expired the shared session cache 112 can determine at operation 608 if it has received a request for the entry from a load balancer 106, such as the first load balancer 106 that created the entry or a second load balancer 106. The request may include the entry's source identifier 202, such as the IP address of the client device 102, and be a request for a corresponding destination identifier 204, such as the IP address of a backend server 108 that the client device 102 had previously been connected to and may have begun a session 114 with. If the shared session cache 112 has not received a request for the entry, the shared session cache 112 can loop back to operation 604 to determine if the entry's timer 206 has expired.

If the entry's timer 206 has not expired and the shared session cache 112 has received a request for the entry from the first load balancer 106 or a second load balancer 106 at operation 608, the shared session cache 112 can provide some or all data from the entry to the requesting load balancer 106 at operation 610. The requesting load balancer 106 may therefore be able to use the provided data from the entry to connect the client device 102 to the backend server 108 identified in the entry, such that the client device 102 and the backend server 108 can continue an existing session 114.

At operation 612, the shared session cache 112 may reset the entry's timer 206 based on providing the information to the requesting load balancer 106 or based on input provided by the requesting load balancer 106. The shared session cache 112 can then loop back to operation 604 and begin checking if the reset timer 206 has expired.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   receiving, by a load balancer, a connection request from a client device;
   determining, by the load balancer, that a shared session cache accessible by the load balancer and one or more other load balancers includes an entry indicating that the client device is associated with a specific backend server of a server pool containing a plurality of backend servers, the load balancer and the one or more other load balancers being capable of connecting the client device with at least the specific backend server; and
   connecting, by the load balancer and based on the entry, the client device to the specific backend server;
   receiving, by another load balancer of the one or more other load balancers, another connection request from the client device;
   determining, by the other load balancer, that the shared session cache accessible by the load balancer and the one or more other load balancers includes the entry indicating that the client device is associated with the specific backend server of the server pool containing the plurality of backend servers;
   connecting, by the other load balancer and based on the entry, the client device to the specific backend server; and
   adding a new backend server to the server pool,
   wherein information about the new backend server is provided to the load balancers within a threshold period of time, an administrator utilizing a user interface can enable or disenable the shared session cache associated with one or more VIPs (Virtual Internet Protocol Addresses), the disabling of the shared session cache and causes the load balancers associated with a particular VIP to utilize their own local cache to connect client devices to the backend servers, and the entry includes at least a source identifier of the client device, a destination identifier of the specific backend server, and a timer.

2. The method of claim 1, wherein the entry was created in the shared session cache by one of the one or more other load balancers.

3. The method of claim 1, further comprising updating, by the load balancer, the entry in the shared session cache.

4. The method of claim 3, wherein the updating comprises resetting the timer associated with the entry.

5. The method of claim 1, wherein the load balancer creates the entry in the shared session cache in part by setting the timer associated with the entry.

6. The method of claim 1, further comprising creating, by the load balancer, a local entry in a local cache stored at the load balancer that corresponds to the entry.

7. The method of claim 1, wherein the load balancer and the one or more other load balancers are identified with unique Virtual Internet Protocol addresses.

8. The method of claim 1, wherein the load balancer is a virtual load balancer instance hosted at a network element.

9. The method of claim 1, wherein the source identifier indicates a first Internet Protocol address of the client device and the destination identifier indicates a second Internet Protocol address of the specific backend server.

10. The method of claim 9, wherein the entry further contains at least one of a forward destination identifier that identifies the load balancer to the client device and a reverse source identifier by which the specific backend server can identify the client device.

11. A method comprising:
    receiving, by a load balancer, a connection request from a client device;
    determining, by the load balancer, that a shared session cache accessible by the load balancer and one or more other load balancers does not include an entry indicating that the client device is associated with a backend server of a server pool containing a plurality of backend servers;
    selecting, by the load balancer, a specific backend server from the server pool for the client device, the load balancer and the one or more other load balancers being capable of connecting the client device with at least the specific backend server;
    connecting, by the load balancer, the client device to the specific backend server;
    creating, by the load balancer, a new entry in the shared session cache indicating that the client device is associated with the specific backend server, the entry including at least a source identifier of the client device, a device identifier of the specific backend server, and a timer;
    receiving, by another load balancer of the one or more other load balancers, another connection request from the client device;
    determining, by the other load balancer, that the shared session cache accessible by the load balancer and the one or more other load balancers includes the entry indicating that the client device is associated with the specific backend server;
    connecting, by the other load balancer and based on the entry, the client device to the specific backend server; and
    adding a new backend server to the server pool,
    wherein information about the new backend server is provided to the load balancers within a threshold period of time, an administrator utilizing a user interface can enable or disenable the shared session cache associated with one or more VIPs (Virtual Internet Protocol Addresses), the disabling of the shared session cache and causes the load balancers associated with a particular VIP to utilize their own local cache to connect client devices to the backend servers.

12. The method of claim 11, wherein the load balancer creates the new entry in the shared session cache in part by setting the timer associated with the new entry.

13. The method of claim 11, further comprising creating, by the load balancer, a local entry in a local cache stored at the load balancer that corresponds to the new entry.

14. The method of claim 11, wherein the load balancer and the one or more other load balancers are identified with unique Virtual Internet Protocol addresses.

15. The method of claim 11, wherein the load balancer is a virtual load balancer instance hosted at a network element.

16. A system, comprising:
one or more processors; and
memory storing computer-executable instructions that, when executed by the one or more processors, cause the one or more processors to perform operations comprising:
receiving, by a load balancer, a connection request from a client device;
determining, by the load balancer that a shared session cache accessible by the load balancer and one or more other load balancers includes an entry indicating that the client device is associated with a specific backend server of a server pool containing a plurality of backend servers, the load balancer and the one or more other load balancers being capable of connecting the client with at least the specific backend server; and
connecting, by the load balancer and based on the entry, the client device to the specific backend server;
receiving, by another load balancer of the one or more other load balancers, another connection request from the client device;
determining, by the other load balancer, that the shared session cache accessible by the load balancer and one or more other load balancers includes the entry indicating that the client device is associated with the specific backend server of the server pool containing the plurality of the backend servers; and
connecting, by the other load balancer and based on the entry, the client device to the specific backend server,
wherein the entry includes at least a source identifier of the client device, a destination identifier of the specific backend server, and a timer.

17. The system of claim 16, wherein the entry was created in the shared session cache by one of the one or more other load balancers.

18. A system, comprising:
one or more processors; and
memory storing computer-executable instructions that, when executed by the one or more processors, cause the one or more processors to perform operations comprising:
receiving, by a load balancer, a connection request from a client device;
determining, by the load balancer, that a shared session cache accessible by the load balancer and one or more other load balancers includes an entry indicating that the client device is associated with a specific backend server of a server pool containing a plurality of backend servers, the load balancer and the one or more other load balancers being capable of connecting the client device with at least the specific backend server;
connecting, by the load balancer and based on the entry, the client device to the specific backend server;
receiving, by another load balancer of the one or more other load balancers, another connection request from the client device;
determining, by the other load balancer, that the shared session cache accessible by the load balancer and one or more other load balancers includes the entry indicating that the client device is associated with the specific backend server of the server pool containing the plurality of backend servers;
connecting, by the other load balancer and based on the entry, the client device to the specific backend server; and
adding a new backend server to the server pool,
wherein information about the new backend server is provided to the load balancers within a threshold period of time, an administrator utilizing a user interface can enable or disenable the shared session cache associated with one or more VIPs (Virtual Internet Protocol Addresses), the disabling of the shared session cache and causes the load balancers associated with a particular VIP to utilize their own local cache to connect client devices to the backend servers, and the entry includes at least a source identifier of the client device, a destination identifier of the specific backend server, and a timer.

19. The system of claim 18, wherein the updating comprises resetting a timer associated with the entry.

20. The system of claim 16, wherein the operations further comprise creating a local entry in a local cache stored at the memory that corresponds to the entry.

* * * * *